(12) United States Patent
Silverman et al.

(10) Patent No.: US 8,787,300 B2
(45) Date of Patent: Jul. 22, 2014

(54) METHOD AND APPARATUS FOR FACILITATING A FAST HANDOFF IN A WIRELESS METROPOLITAN AREA NETWORK

(75) Inventors: Shmuel Silverman, Buffalo Grove, IL (US); Randy L. Ekl, Lake Zurich, IL (US); Colin D. Frank, Park Ridge, IL (US); Aparna Pandey, Chicago, IL (US); Ron Rotstein, Austin, TX (US); Christopher G Ware, Chicago, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1402 days.

(21) Appl. No.: 11/422,187

(22) Filed: Jun. 5, 2006

(65) Prior Publication Data

US 2007/0280176 A1 Dec. 6, 2007

(51) Int. Cl.
*H04W 4/00* (2009.01)
*H04W 36/00* (2009.01)
*H04W 76/02* (2009.01)

(52) U.S. Cl.
CPC .......... *H04W 36/0055* (2013.01); *H04W 76/02* (2013.01)
USPC .......................................... 370/330; 455/436

(58) Field of Classification Search
USPC .................. 455/436–444; 370/331
See application file for complete search history.

(56) References Cited

U.S. PATENT DOCUMENTS

| 6,377,805 B1 * | 4/2002 | Anvekar et al. ............... 455/436 |
| 2002/0039901 A1 * | 4/2002 | Sugimoto ..................... 455/436 |
| 2003/0054824 A1 * | 3/2003 | Choi et al. .................... 455/436 |
| 2003/0179731 A1 | 9/2003 | Noguchi et al. |
| 2004/0203781 A1 | 10/2004 | Lefkowitz |
| 2005/0130656 A1 * | 6/2005 | Chen .............................. 455/436 |
| 2005/0192011 A1 | 9/2005 | Hong et al. |
| 2007/0004415 A1 * | 1/2007 | Abedi ............................ 455/442 |

OTHER PUBLICATIONS

PCT/US07/67778, PCT Search Report and Written Opinion, mailed Jan. 15, 2008, 9 pages.
PCT/US2007/067778, PCT Preliminary Report on Patentability, mailed Dec. 24, 2008, 8 pages.
EPC Extended Search Report Dated Dec. 4, 2012 for Counterpart Application PCT/US2007067778.
Chinese Office Action Dated Dec. 16, 2011 for Counterpart Application CN200780020937.3.
Australian Office Action Dated May 27, 2010 for Counterpart Application 2007258107.
Chinese Office Action Dated Jun. 12, 2010 for Counterpart Appliction CN200780020937.3.

* cited by examiner

*Primary Examiner* — Michael Faragalla
(74) *Attorney, Agent, or Firm* — Indira Saladi; Randi L. Karpinia; Kenneth A. Haas

(57) ABSTRACT

A method and apparatus for facilitating a fast handoff for subscribers in a Wireless Metropolitan Area Network (WMAN) by establishing a hard association with a first entity by sending a hard association request to the first entity and receiving a hard association response in response to the hard association request and establishing a pending association with a second entity by sending a pending association request to a second entity and receiving a pending association response from the second entity. In one embodiment, the pending association with the second entity may be converted to a hard association.

24 Claims, 5 Drawing Sheets

METHOD AND APPARATUS FOR FACILITATING A FAST HANDOFF IN A WIRELESS METROPOLITAN AREA NETWORK

FIELD OF THE INVENTION

The present invention relates generally to Wireless Metropolitan Area (WMAN) networks and specifically to facilitating a fast handoff for subscribers in the WMAN.

BACKGROUND OF THE INVENTION

A wireless metropolitan area network (WMAN) offers broadband network access to subscribers in a metropolitan area where exterior antennas in the metropolitan area provide access to the broadband network (also termed a core network). A WMAN allows a subscriber of the WMAN to freely move while remaining connected to the core network. The subscriber connects to the core network by associating with access points (APs) of the WMAN. An AP is also known as a base station. As such, the AP provides wireless coverage for a specific area so that subscribers within coverage are connected to the core network. A subscriber may be connected to the core network through a network of APs (also termed "backhaul").

As the subscriber moves between APs of the WMAN, the connection to a first AP may by dropped as needed, and a connection to a target AP may be established. The process of transferring the subscriber's connection from one AP to another AP is known as hand-off. For example, when the subscriber is in the coverage area of a first AP, the subscriber is connected to the core network via the first AP. However, when the subscriber moves out of the coverage area of the first AP, the subscriber loses its associated with the first AP and it becomes associated with another AP, namely a second AP.

A subscriber may lose its association with an AP more quickly when the subscriber is moving at high speeds. As such, had-off becomes more complicated when the time it takes to hand-off is larger than the time spent by the subscriber within a specific AP coverage area. For example, when a subscriber moves at 70 MPH or more, the subscriber may move between APs in a few seconds. If the association set up takes a very lone time, even as short as 500 ms, packets may be lost in the transition and maintaining a reasonable quality of service (QoS) is challenging. Even if the subscriber is not moving at high speeds, many times in a WMAN a subscriber may lose connection with a specific AP without prior warning. For example, if the subscriber is in a WMAN with high rise buildings where antennas are placed at low sites, a subscriber turning the corner may lose connection with its previously associated AP without any prior warning thereby causing packets to be lost and potentially disrupting the flow of packets to the subscriber.

Moreover, many existing hand-off solutions are not applicable to a mission critical situation where at an incident scene a subscriber may lose its connectivity to an AP (e.g. due to power discrepancies and/or APs coming in and out of service). Additionally, current hand-off solutions do not address the situation where a subscriber hands-off to an AP that can not serve the subscriber, for example because the AP is heavily loaded. Further, existing hand-off solutions do not address the problem where an AP providing connectivity to the core network in a multiple layered AP backhaul fails, then the APs that are served by the failed AP need to fine another AP for connecting to the core network. In such a situation, these APs are performing hand-off in order to prevent the loss of packets that are with the failed AP. Further yet, current hand-off solutions do not provided the ability to provided secure links since secure links take time to set up.

Thus, there is a need for a new method and a system for facilitating fast handoff in a Wireless Metropolitan Area Network (WMAN).

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE INVENTION

Figure 1:
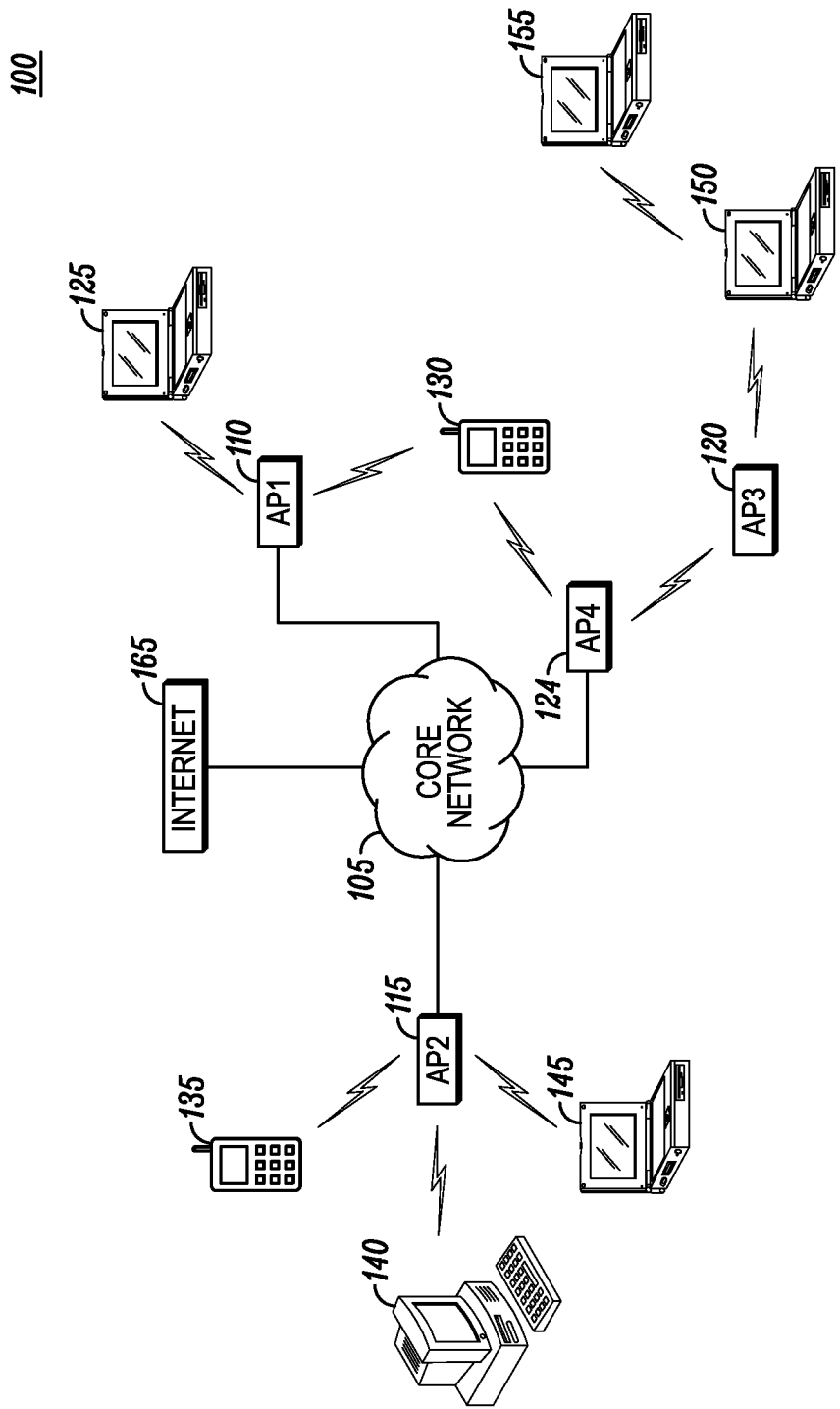
FIG. 1 illustrates a block diagram illustrating a WMAN in accordance with an embodiment of the present invention.

Before describing in detail embodiments that are in accordance with he present invention, it should be observed that the embodiments reside primarily in combinations of method steps and apparatus components related to facilitating a fast handoff in a WMAN. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated tat for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a". "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being "close to" as understood by one of ordinary skill in the art, and in one non-limiting embodiment the term is defined to be within 10%, in another embodiment within 5%, in another embodiment within 1% ad in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for facilitating a fast handoff in a WMAN. The non-processor circuits may include, but are not limited to, a radio receiver, a radio transmitter, signal drivers, clock circuits, power source circuits, and user input devices. As such, these functions may be interpreted as steps of a method or blocks of an apparatus to facilitate a fast handoff in the WMAN. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the present invention provides a method and apparatus for facilitating fast handoff in a WMAN. For this purpose, the present invention requires that the subscriber create an association with a second entity before the subscriber breaks its current association with the first entity. By doing so, packet loss may be minimized during handoff. As used herein, an entity is another subscriber or an AP where the entity provides access to a core network either directly or via another entity.

Turning now to FIG. 1, a block diagram illustrating a WMAN 100 in accordance with an embodiment of the present invention is shown. Subscribers, e.g. 125-155, connect to a core network 105 via access points (APs), e.g. 110-124. As is known in the art, the core network 105 may be a hard wired network, e.g. a local area network or a routed network. As is known in the art, a core network 105 is often referred to as a backbone network since it is a network that connects to other networks, e.g. Internet 165. Core network 105 may have multiple APs attached to it, for example AP1 110, AP2 115, AP3 120, and AP4 124, where AP4 is connected to the core network via AP3 120 (where the two APs 120, 124 are referred to as "multi-layer backhaul"). In one embodiment of the present invention, once a subscriber becomes aware of an AP (referred to as a "new AP") within its coverage, if the subscriber is not already associated with an AP, the subscriber may become associated with the new AP. If the subscriber is already associated with an AP, the subscriber may perform a pending association with the new AP.

As is known to one of ordinary skill in the art, FIG. 1 illustrates a WMAN environment in an infrastructure mode, where the subscribes are provided a connection to the infrastructure, e.g. core network 105, via the APs. Further known to one of ordinary skill in the art, the subscribers in a WMAN may be able to communicate without the APs and may be able to communicate directly. Such an environment where there does not exist a connection to the infrastructure is termed "ad-hoc." For example, if subscriber 150 were not connected to AP3 120, then the communication between subscribers 150, 155 is termed ad-hoc. Further, the WMAN environment for these two subscribers 150, 155 is in ad-hoc mode.

In accordance with an embodiment, subscriber 125 and subscriber 130 are connected to core network 105 by associating with AP1 110. Subscriber 135, subscriber 140 and subscriber 145 are connected to core network 105 by associating with AP2 115, and subscriber 150 is connected to core network 105 by associating with AP3 120. Those skilled in the art shall appreciate that a plurality of APs can be connected to core network 105 and a plurality of subscribers can be associated with each AP. Thus, the number of subscribers and APs depicted in FIG. 1 is only for the purpose of illustration.

A single subscriber may be within coverage of many APs. For example, a subscriber at a traffic light may be within coverage of two APs, but as the subscriber moves, e.g. turning a corner, the subscriber may be within coverage of two more APs. In conventional hand-off solutions, a subscriber associated with an AP may lose connection wit the associated AP while turning a corner and associate with another AP within the subscribers range. Due to the movement of the subscriber, the subscriber may need to associate with different APs to retain connection to the core network 105 while the subscriber is moving. An embodiment of the present invention utilizes pending associations with entities, e.g. APs and/or subscribers to facilitate handoff.

An embodiment of the present invention propose a method by which a subscriber can create a pending association with a plurality of entities. A pending association allows the subscriber to handoff quickly since the procedures involved for handoff have been completed prior to the actual handoff. The subscriber can handoff to one of the entities with which the subscriber has created pending associations by sending a message that changes the pending association to a hard association. Those skilled in the art shall appreciate that a hard association is defined as an association where an entity is responsible for providing coverage and relaying packets to the subscriber. For example, when a hard association is created between an AP and a subscriber, the AP serves the subscriber and is responsible for relaying packets to the subscriber.

Figure 2:
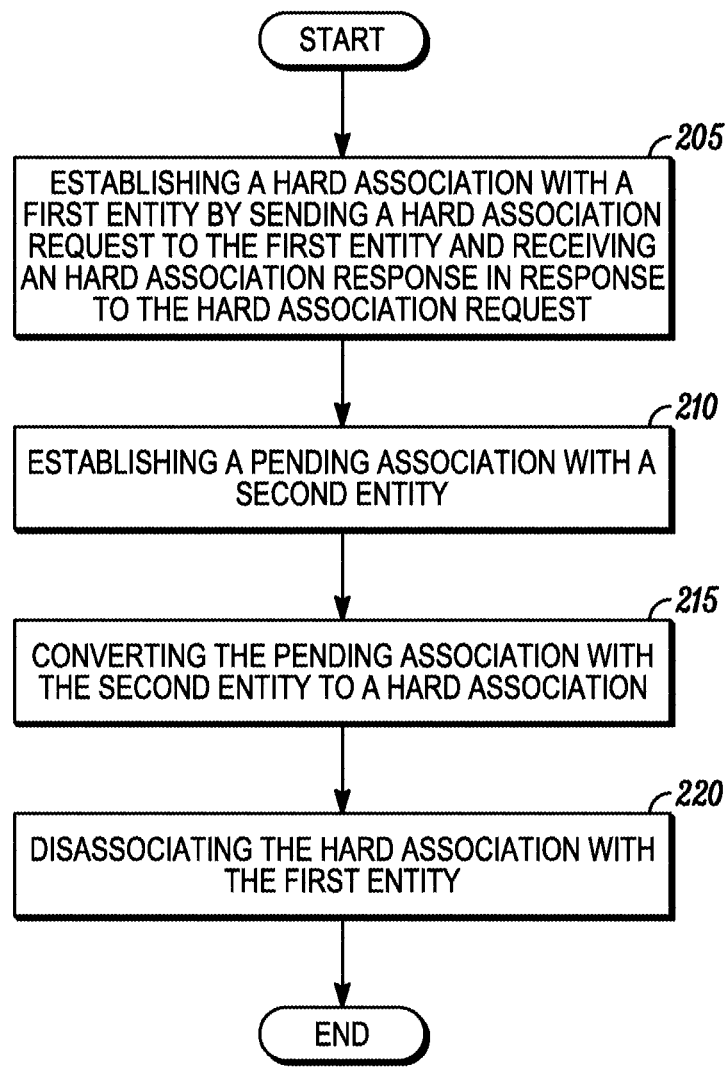
FIG. 2 illustrates a flow diagram of a method for facilitating a fast handoff for a subscriber in a WMAN in accordance with an embodiment of the present invention.

Referring now to FIG. 2, a flow diagram of a method of facilitating a fast handoff for a subscriber in a WMAN is shown in accordance with an embodiment of the present invention In operation, the subscriber may initially be disconnected from an entity of the core network and may connect upon power up. As previously mentioned, an entity can be an AP or another subscriber and the entity can be connected either directly or indirectly through one or more entities. In accordance with an embodiment, the subscriber establishes a hard association with one entity and that entity provides coverage and relays packets for the subscriber. In one embodiment, establishing a hard association is performed by sending a hard association request to the first entity and receiving a hard association response in response to the hard association request, step 205. Those skilled in the art shall appreciate that the process of hard associating with an entity, for example an AP, is well known in the art. For example, in one embodiment, the process of hard associating is defined as sending by the subscriber an IEEE 802.11 request message to the entity and receiving by the subscriber an IEEE 802.11 response message from the entity.

Once the subscriber has preformed a hard association with an entity, the entity can establish pending associations, step 210, with other entities for which the subscriber may need to become hard associated with at a later time. As such, pending associations may serve to expedite future handoffs and may serve as back-ups. In one embodiment, establishing a pending association is defined as sending a pending association request and receiving a successful pending association response. In one embodiment, a successful pending associate response communicates encryption keys for use between the specific subscriber and entity and also an Internet Protocol (IP) address by the entity for use by the subscriber. For example, when a subscriber performs a pending association with a target entity which is in a different sub-net than the sub-net which the subscriber is in, the IP address for the subscriber is included wit the pending association response sent by the entity.

In one embodiment, the pending association request is a modified IEEE 802.11 request and may comprise a Medium Access Control (MAC) layer address corresponding to the subscriber, a MAC layer address corresponding to the entity with which subscriber is currently hard associated and a MAC layer address corresponding to the entity that the subscriber wishes to pending associate with. The pending association request can also comprise encryption key derivation material, an identifier indicating that it is a pending association request and a desired lifetime for the pending association. Further, the pending association request can also comprise desired capability of the target entity, for example the load bearing capability and the power capability.

In one embodiment, the pending association response can also be a modified IEEE 802.11 response comprising at least one of an encryption key derivation material, a MAC layer address corresponding to the subscriber, a MAC layer address corresponding to the entity, an acknowledgement or negative acknowledgement for the pending associates request, and a lifetime for the pending association. If an acknowledgement is sent in the pending association response, the pending association response can also comprise an IP address for the subscriber and the subscriber can then be pending associated with the entity.

In any case, establishing a pending association is useful for maintaining connectivity to the core network. For example, in the event that the subscriber loses its hard association with the first entity, if the first entity roams away or is switched off, then the subscriber does not lose connection with the core network. As such, the subscriber establishes a pending association with a second entity, step 210. In one embodiment, the subscriber sends a pending association request to all entities that are within coverage of the subscriber, e.g. in the subscriber's wireless neighborhood.

In one embodiment of the present invention, the pending association is temporary, where temporary means that the pending association expires. The pending association may expire based upon factors such as a time-limit, an activity level of the subscriber, an activity level of an entity, or capabilities desired by the subscriber or offered by the entity. For example, a subscriber may send a pending association to an AP where the pending association expires after a time interval if the pending association is not converted to a hard association. In one embodiment, the time interval is a predetermined parameter of the WMAN. In other embodiments, the time interval may be determined by the subscriber and/or the APs.

In any case, the pending association expires if the pending association is not converted to a hard association within a predetermined time.

Terminating a pending association can be used to tree resources at the entity having the pending associations. As such, a subscriber, in order to retain the pending associations, may need to refresh the pending association by timely basis. For example, the subscriber can refresh the pending association by sending short periodic messages to an AP so that the refresh rate can be increased. Another example, an AP can inform the subscriber before terminating a pending association so that the subscriber may respond and refresh the pending association before termination. In any case, the entity having the pending associations may terminate the pending associations in order to free resources at the entity.

In another embodiment of the present invention, the pending association may be indefinite, indefinite means that the pending association does not expire. A pending association that does not expire may be useful if the entity provides backup coverage for the subscriber. For example, referring to FIG. 1, subscriber 130 may have a hard association with an AP in a multiple layer of APs (e.g. AP4 124) and the subscriber 130 may wish to maintain a secondary route (e.g. via AP1 110) in case an AP in the multiple layer of APs fails. For example, if AP3 120 or AP4 124 fails, then the subscriber will lose connectivity to the core network 105.

Continuing with FIG. 2, the pending association with the second entity may be converted to a hard association, step 215. In one embodiment, as is known to one of ordinary skill in the art, conversion is initiated by the subscriber sending a message to the entity to convert the pending association to a hard association. Since exchanging the encryption key derivation materials, setting IP addresses and completing any other formalities for hard association have already been accomplished during the pending association step, namely 210, the time it takes for handoff is substantially reduced.

In one embodiment, the step of converting the pending association to a hard association takes into account several parameters. For example, the subscriber may take into account a service load of the entity, signal strength to the entity, and a number of subscriber served by the entity. The subscriber may choose an optimal entity to handoff to based upon these parameters. Alternatively, the determination of an optimal entity may be preformed by the entity, instead of the subscriber. For example, when the subscriber is connecting to the core network via another subscriber, the second entity may perform the calculations required for determining an optimal entity to hand-off to based upon the parameters. In yet another alternative, the subscriber as well as the second entity may perform the determination of an optimal entity. Upon the pending association with the second entity being converted to a hard association, step 215, the second entity can start routing messages to the subscriber. Finally, the subscriber may dissociate the hard association with the first entity, step 220. In one embodiment, the dissociate can either occur directly from the subscriber to the first entity via a message, from the subscriber through the second entity to the first entity explicitly with a message from the first subscriber, via a message initiate via a timeout from the second entity, or by other mechanisms known in the art.

During this process, the first entity (the entity the subscriber had been previously hard associated with) may continue to forward messages meant for the subscriber, e.g. where there are pending messages with the first entity. Because the first entity may still forward messages to the subscriber, data loss is minimized. As is known in the art, the forwarding of messages may be performed wirelessly if the subscriber is still in coverage of the first entity or forwarded over the infrastructure to the second entity, as is done conventionally, for example using an Inter-Access Point Protocol (IAPP). In any case, the pending association conversion to hard association minimizes data loss during handoff.

Figure 3:
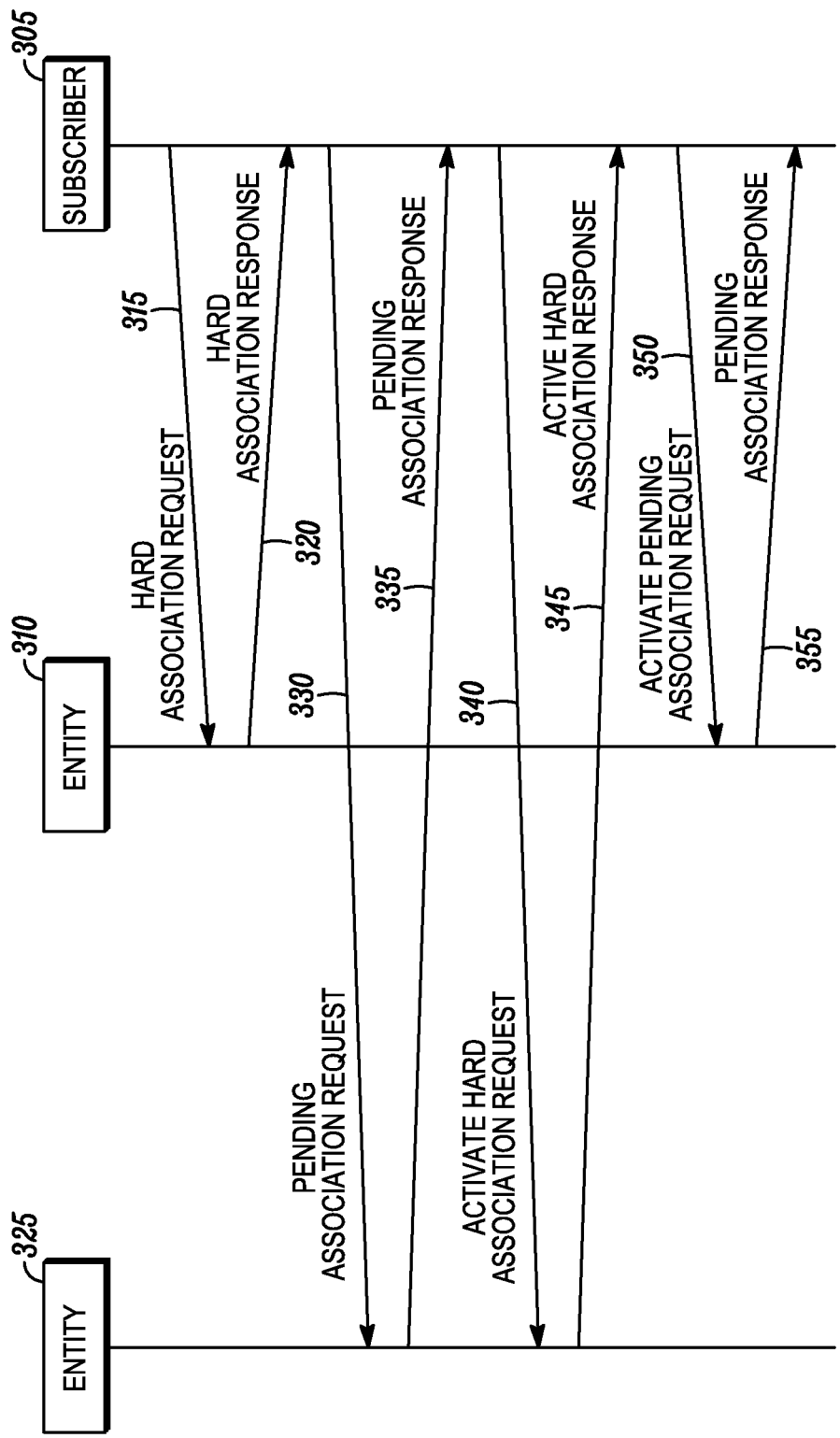
FIG. 3 illustrates a message flow diagram depicting handoff in an ad-hoc WMAN in accordance with an embodiment of the present invention.

Referring now to FIG. 3, a message flow diagram depicting a hand-off in an ad-hoc WMAN is shown in accordance with an embodiment of the present invention. As mentioned previously, the WMAN can also be an infrastructure based network, however FIG. 3 is described with reference to entities in an ad-hoc WMAN where the entities do not have connectively to a core network. For understanding FIG. 3, assume that a subscriber 305 is within coverage of entity 310. As mentioned previously, entity 310 may be an AP or another subscriber. Those skilled in the art will realize that in an ad-hoc network, there is a need to create associations with neighboring entities in case coverage with an associated entity is lost. Further, those skilled in the art will realize that establishing these associations may need to be quick in case coverage is quickly changed.

Subscriber 305 establishes a hard association with entity 310 by sending a hard association request 315 to entity 310 and by receiving a hard association response 320 from entity 310. The hard association response 320 is generally used by entity 310 to inform subscriber 305 whether the hard association request 315 has been fulfilled. If an acknowledgement is received in the hard association response 320, then subscriber 305 can be considered to be hard associated with entity 310. In the case where the WMAN is in infrastructure mode, e.g. where entity 310 provides connectivity to the core network either directly or indirectly via another entity, the subscriber 305 is connected to the core network upon being hard associated with entity 310. In any case, entity 310 is now responsible for facilitating wireless communication of subscriber 305 with other entities in the WMAN.

Upon being hard associated with entity 310, subscriber 305 sends a pending association request 330 to a plurality of other entities, e.g. APs and/or subscribers, in its neighborhood. As is known in the art, the plurality of other entities may be discovered via a number of known means, e.g. via subscriber 305 scanning the channels in the WMAN, via a neighbor list of the subscriber 305, etc. In the neighbor list embodiment, the subscriber 305 may use the neighbor list to determine which entities to create a pending association with.

If an entity 325 is in the neighborhood of subscriber 305 (e.g. known via the neighbor list of subscriber 305), the subscriber 305 sends a pending association request 330 to entity 325. As mentioned previously, the pending association assists during hand-off by reducing the data loss in the transition to hard association from entity 310 to entity 325. In any case, entity 325 sends a pending association response 335 to subscriber 305, in response to the pending association request 330.

If the pending association response indicates that the pending association request is successful, then subscriber 305 is now hard associated with entity 310 and pending associated with entity 325. As mentioned previously, those skilled in the art will appreciate that subscriber 305 can be pending associated with a plurality of entities at the same time which is useful if the subscriber 305 becomes dissociated with entity 310 for any reason, e.g. if subscriber 305 roams out of coverage of entity 310 or the signal strength to entity 310 becomes weak. In such a situation, subscriber 305 can request entity 325 to convert its pending association into a hard association by sending a message to entity 325. In one embodiment, to convert the pending association to a hard association, subscriber 305 sends an activate hard association request 340 to entity 325.

In one embodiment, the activate hard association request 340 can comprise a MAC layer address corresponding to subscriber 305, a MAC layer address corresponding to entity 325, and an identifier indicating a pending association to hard association transition. Those skilled in the art will realize that since encryption key derivation materials are exchanged while establishing the pending association, a need to exchange the encryption key derivation materials during pending association to hard association transition is obviated. The pending association with entity 325 is converted to a hard association by the entity 325 transmitting an activate hard association response 345. Since the pending association to hard association transition consists of only these two messages, a fast hand-off is facilitated. In one embodiment, since key material has already been exchanged, the activate hard association request and the activate hard association response may be encrypted.

Continuing with FIG. 3, the hard association with entity 310 can be converted to a pending association. Subscriber 305 can convert the hard association to a pending association by sending an activate pending association request 350 to entity 310. In one embodiment, the activate pending association request 350 can comprise at least one of a MAC layer address corresponding to subscriber 305, a MAC layer address corresponding to entity 310, and an identifier indicating a hard association to pending association transition. The activate pending association request 350 can further comprise an 1 address of subscriber 305. In response, an activate pending association response 355 is sent to the subscriber to indicate the success of the activate pending association request 350.

Figure 4:
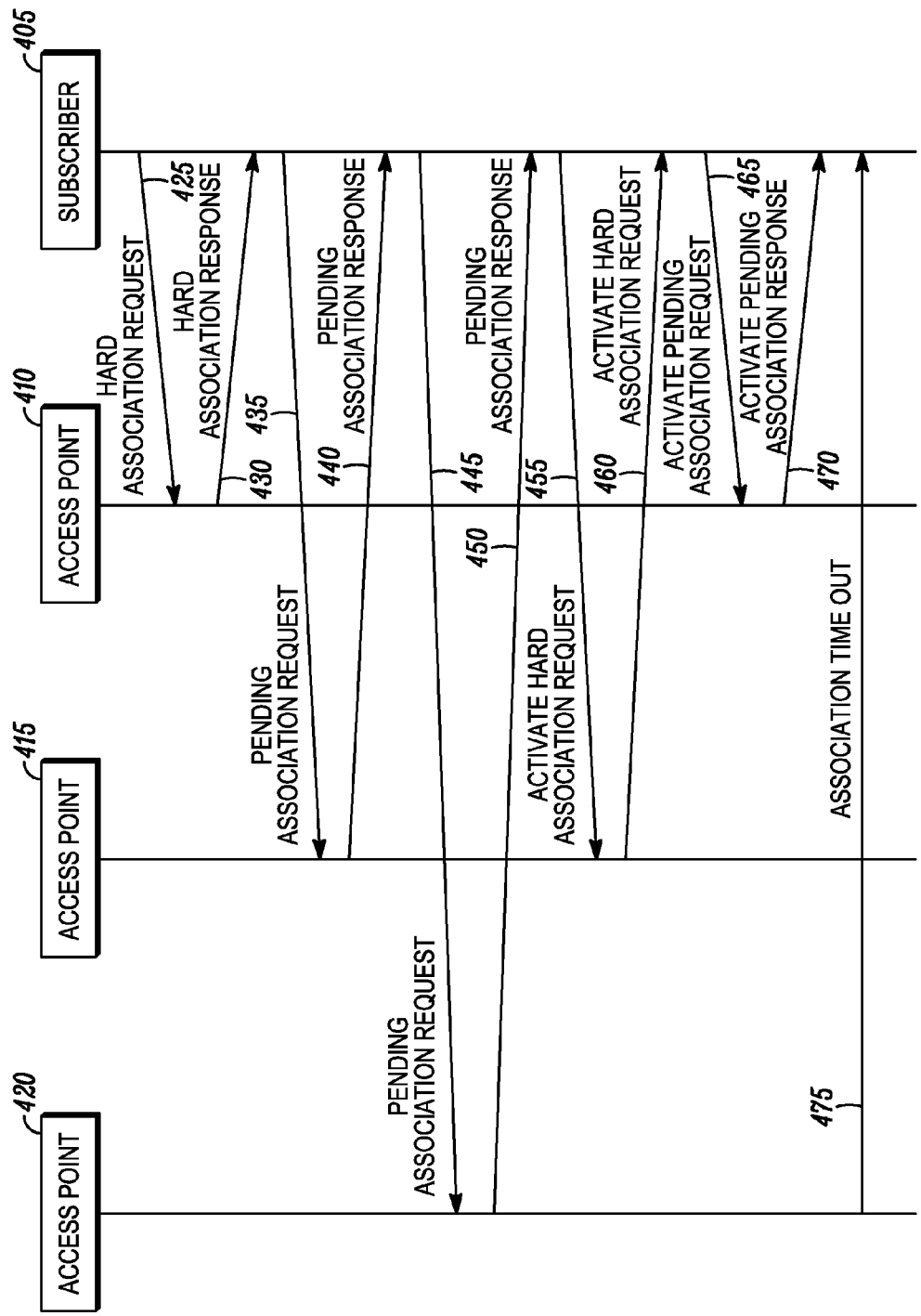
FIG. 4 illustrates a message flow diagram depicting handoff in a WMAN in accordance with an embodiment of the present invention.

Referring now to FIG. 4, a message flow diagram depicting a hand-off in a WMAN is shown in accordance with an embodiment of the present invention. For understanding FIG. 4, assume that a subscriber 405 is within coverage of APs 410, 415, and 420. As such, subscriber 405's neighbor list comprises APs 410, 415, and 420. If subscriber 405 is not already associated with an AP, subscriber 405 sends a hard association request 425 to an AP, e.g. 410. In response, the AP, e.g. AP 410, sends a hard association response 430 to subscriber 405. As mentioned earlier, the hard association response 430 can comprise an acknowledgement or negative acknowledgement for the hard association request 425. If an acknowledgement is received in the hard association response 430, subscriber 405 is hard associated with the AP, e.g. AP 410. Upon being hard associated with the AP, e.g. AP 410, the subscribed can pending associated with a plurality of APs in its neighborhood. For this purpose, subscriber 405 send a plurality of pending association requests to its neighboring APs, e.g. APs 415, 420.

In one embodiment of the present invention, a subscriber can create a pending association with a predefined number of entities based on selecting a number of entities that meet performance parameters, e.g. signal strength, load or other factors. This limit on the number of pending associations can also limit the messaging over the air and memory required in the APs and the subscribers. Moreover, there can also be a limit on the rate at which the subscriber can send pending association requests to limit the messaging over the air. As is known to one of ordinary skill in the art, standard techniques may be used to control the limit on the number of pending associations and the rate at which pending association requests are sent, e.g. by limiting the number of pending associations that a subscriber can have to say three and implementing a hysteresis function for limiting the rate at which pending association requests can be sent by the subscriber.

Referring back to FIG. 4, subscriber 405 sends a pending association request 435 to another AP, e.g. AP 415. AP 415 then sends the subscriber 405 a pending association response 440. An acknowledgement or a negative acknowledgement can be included in the pending association response 440. A pending association request can be rejected if the load on AP 415 is above a predetermined threshold. For example, if AP 415 is serving many subscribers and does not have the capability to serve subscriber 405, then AP 415 may reject the pending association request 435. Those skilled in the art will realize that a rejection of a pending association request may be used as a load balancing mechanism. A rejection by an AP can let a subscriber know that the subscriber should not try to hand-off with the AP at that particular time.

Continuing with FIG. 4, AP 415 sends an acknowledgement in the pending association response 440 to subscriber 405 and subscriber 405 is now pending associated with AP 415. Subscriber 405 may also try to pending associate with AP 420, which can be in the neighborhood of subscriber 405, if the pending associations that subscriber 405 can create has not reached a predefined number. Subscriber 405, therefore, sends a pending association request 445 to AP 420. AP 420 sends a pending association response 450 comprising an acknowledgement or negative acknowledgement to subscriber 405. As mentioned earlier, the pending association response 450 can comprise encryption key derivation material and an IP address for subscriber 405 so that a transition from pending association to hard association is expedited and the hand-off time is substantially reduced. Subscriber 405 can pending associate with a plurality APs in a similar manner.

Subscriber 405 can decide to convert the pending association with AP 415 into a hard association if, for instance, the signal strength of AP 410 reduces and the signal strength of AP 415 is relative better than the other APs that subscriber 405 is pending associated with. To perform the conversion, subscriber 405 sends an activate hard association request 455 to AP 415. The activate hard association request 455 can be a message that can change a pending association into a hard association. Typically, the activate hard association request 455 to AP 415 can comprise at least one of a MAC layer address corresponding to subscriber 405, a MAC layer address corresponding to AP 415, and an identifier indicating a pending association to hard association transition. Subscriber 405 is hard associated with AP 415 upon receiving the activate hard association response 460 indicating that the activate hard association request 455 was successful.

Subscriber 405 can convert its hard association with AP 410 to a pending association if subscribed 405 is still in the neighborhood of AP 410. In one embodiment, converting the hard association into a pending association can be done sending an activate pending association request 465 to AP 410. The activate pending association request 465 may be a message that changes the hard association to a pending association. In one embodiment, the activate pending association request 465 may comprise at least one of a MAC layer address corresponding to subscriber 405, a MAC layer address corresponding to AP 410, and an identifier indicating a hard association to pending association transition. Subscriber 405 is pending associated with AP 410 upon receiving the activate pending association response 470.

As mentioned earlier, subscriber 405 may need to refresh the subscriber's pending association status with the APs 420 and AP 410 on a timely basis to prevent expiration, for example by sending short periodic messages. In an embodiment of the invention, if subscriber 405 fails to refresh its pending association status with AP 420, AP 420 sends an association time out message 475 to subscriber 405. As such, the pending association of subscriber 405 with AP 420 is removed In another embodiment, such a message 475 is not required for removing the pending association. For example, the time out may be indicated implicitly when a timer measuring a pending association time expires.

Figure 5:
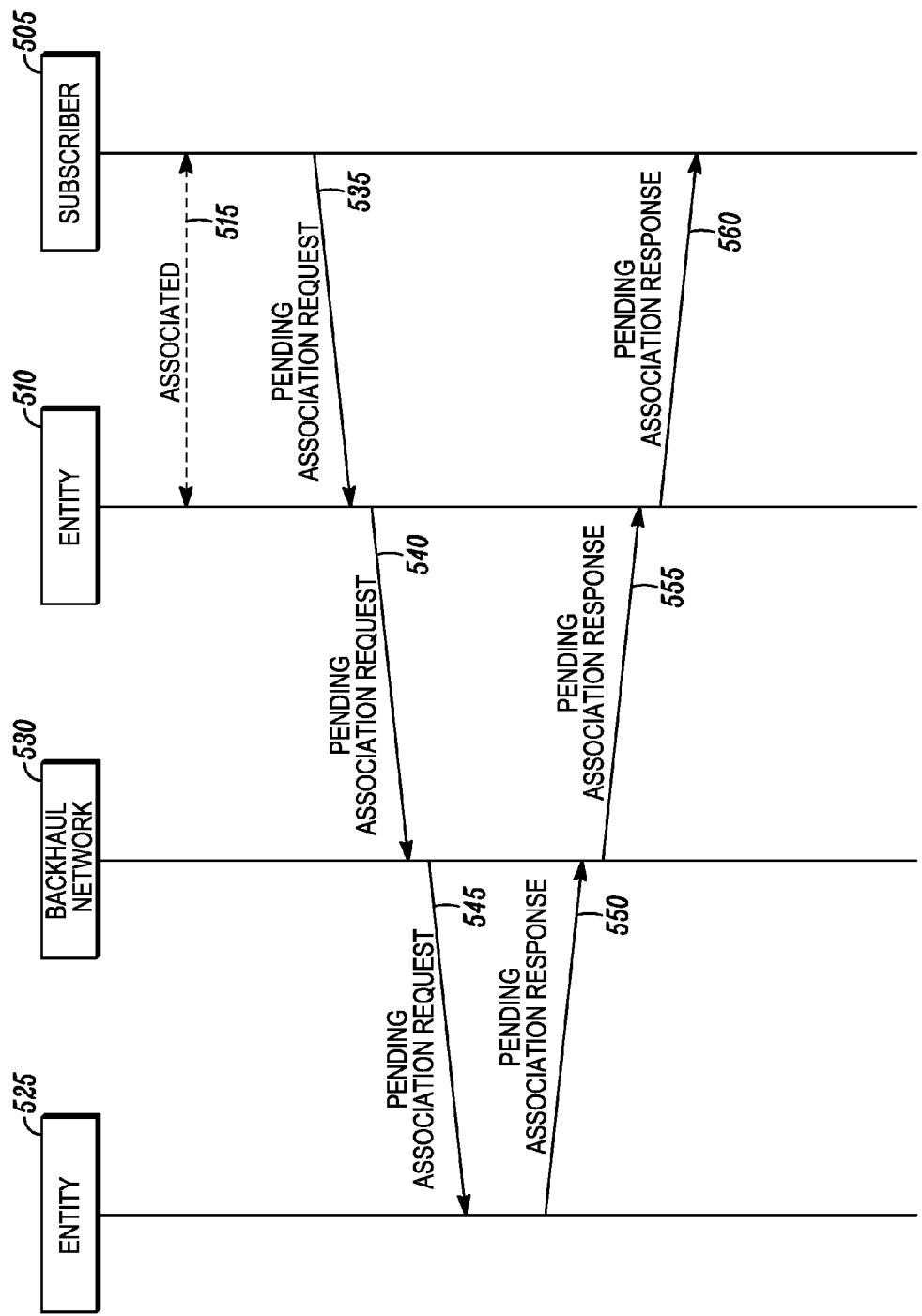
FIG. 5 illustrates a message flow diagram depicting handoff in a WMAN using a proxy access point in accordance with an embodiment of the present invention.

Turning now to FIG. 5, a message flow diagram depicting a hand off in a WMAN using a proxy AP is shown in accordance with an embodiment of the present invention. In some cases due to coverage obstructions, a subscriber may be near an AP but yet not in the coverage area of the AP. For example, in urban environments, a subscriber can be on one street and is about to turn the corner to a perpendicular street, and a building is obstructing coverage of an AP prior to turning the corner. The subscriber may not be able to see the AP but may want to create a pending association with the AP. In other cases, the subscriber may be near an AP but yet not be able to communicate with the AP directly due to restrictions at the AP, e.g. the AP may not accept pending association requests from subscribers it does not trust. Thus, even through the subscriber may not be able to communicate directly with the AP, the subscriber may want to create a pending association with the AP. By virtue of an embodiment of the present invention the subscriber can create a pending association with the AP that it cannot see or communicate with directly.

For the description of FIG. 5, assume that a subscriber 505 is already associated 515 with an entity 510, egg by subscriber 505 sending a hard association request to entity 510 and entity 510 sending subscriber 505 a hard association response or by subscriber 505 sending a pending association request and entity 510 sending a pending association response. Additionally, subscriber 505 is at least hard associated with one entity in the WMAN. e.g. this entity may be entity 510 or another entity in the WMAN. If subscriber 505 is not within coverage of entity 525, then subscriber 505 may not be able to directly create a pending association with entity 525. In such a case, subscriber 505 may create a pending association with entity 525 via proxy pending association messaging. In one embodiment, subscriber 505 sends a proxy pending association request 535 corresponding to entity 525 to intermediate entities, e.g. entity 510. In one embodiment, the intermediate entities forward the proxy pending association request 535 to the destination, namely entity 525.

As such, in FIG. 5, entity 510 acts as a proxy or a forwarding node to forward the proxy pending association request 540 (reformatted from proxy pending association request 535) through a backhaul network 530 to entity 525. The backhaul network 530 reformats the proxy pending association request 540 in accordance with local MAC rules, e.g. Ethernet addressing, into proxy pending association request 545. In any case, the proxy pending association request 545 reaches entity 525. In an embodiment of the present invention, the proxy pending association request 545 comprises routing information tat would allow entity 525 to reply to subscriber 505 through the backhaul network 530. The proxy pending association request 535 comprise a MAC layer address corresponding to entity 525 and subscriber 505. The proxy pending association request 535 can also comprise an encryption key derivation material, an identifier indicating that it is a proxy pending association request and a desired lifetime for the pending association. Further, the proxy pending association request can also comprise desired capability of entity 525, for example the load bearing capability and the power capability.

Upon receiving the proxy pending association request 545, entity 525 sends a proxy pending association response 550 through the backhaul network and the backhaul network forwards the proxy pending association response 550 to entity 510 by reformatting the proxy pending association response 550 into a proxy pending association response 555 in accordance with local MAC addressing rules, e.g. Ethernet addresses. Entity 510 forwards the proxy pending association response 555 to the subscriber as proxy pending association response 560. If an acknowledgement is received in the proxy pending association response 560, subscriber 505 is pending associated with entity 525 even though the subscriber is outside the coverage area of entity 525. Those skilled in the art shall appreciate that the subscriber may not directly communicate with a desired entity, but may indirectly communicate with a desired entity via another entity or network.

In an embodiment of the present invention, a neighbor list can be propagated in the WMAN and subscriber 505 can identify entity 525 using this neighbor list. Each neighboring entity may have unique attributes and subscriber 505 can determine which neighboring entities to create a pending association with using these attributes. Those skilled in the art will realize that subscriber 505 may not be in the coverage area of all the entities listed in the neighbor list.

In another embodiment of the present invention, an entity that subscriber 505 is associated with, for example entity 510, also known as a serving entity, can proxy pending association requests on behalf of subscriber 505. In such a manner, association are initiated without utilizing the wireless medium, e.g. there is no message between the subscriber and the entity to initiate the request. The serving entity 510 can then forward the proxy pending association information, such as encryption key derivation materials, to subscriber 505. Every time subscriber 505 associates with a new entity, the new entity repeats the proxy pending association request and forwards the encryption key derivation materials to subscriber 505.

The various embodiments of the present invention provide a method that facilitates fast handoff in a WMAN. In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The inventions defined solely by the appended claims including any amendments made during the pendency of this application and all equivalents of those claims as issued.

What is claimed is:

1. A method of facilitating a fast handoff for a first wireless communication device in a wireless metropolitan area network (WMAN), the method comprising:
at the first wireless communication device:
establishing a first hard association with a first entity by sending a hard association request to the first entity and receiving a hard association response in response to the hard association request;
establishing a plurality of pending associations with a plurality of second entities by sending a pending association request to each of the plurality of second entities and receiving a pending association response from each of the plurality of second entities, prior to determining a need for handoff of the first wireless communication device to one of the plurality of second entities;
selecting a pending association associated with one of the plurality of second entities when the need for handoff of the first wireless communication device to one of the plurality of second entities is determined;
converting the selected pending association into a second hard association;
converting the first hard association into one of the plurality of pending associations, after converting the selected pending association into the second hard association;
wherein the first entity is one of a second wireless communication device and a first access point, and
wherein each of the plurality of second entities is one of a third wireless communication device and a second access point.

2. The method of claim 1, wherein the pending association request is a modified IEEE 802.11 request.

3. The method of claim 1, wherein the pending association request comprises at least one of a Medium Access Control (MAC) layer address corresponding to the first wireless communication device, a MAC layer address corresponding to one of the plurality of second entities, a MAC layer address corresponding to the first entity, encryption key derivation material, and an identifier indicating that the request is a pending association request.

4. The method of claim 1, wherein the pending association request comprises a desired lifetime for the pending association.

5. The method of claim 1, wherein the pending association response is a modified IEEE 802.11 response.

6. The method of claim 1, wherein the pending association response further comprises an internet protocol (IP) address for the first wireless communication device.

7. The method of claim 1 further comprising disassociating the first hard association with the first entity.

8. The method of claim 1 further comprising sending an activate hard association request to one of the plurality of second entities.

9. The method of claim 1 further comprising prior to the step of converting, determining a hard association conversion should occur by taking into account at least one of a service load, signal strength, and a number of attached wireless communication devices.

10. The method of claim 1, wherein the step of creating a pending association is performed for a predefined number of entities in the WMAN.

11. The method of claim 1, wherein the pending association request is one pending association request of a plurality of pending association requests and the pending association requests are sent at a predefined rate.

12. The method of claim 1, wherein the pending association is temporary whereby the pending association expires based upon at least one of a time-limit, an activity level of the first wireless communication device, an activity level of the first entity, and an activity level of one of the plurality of second entities.

13. The method of claim 1, wherein the pending association does not expire if one of the plurality of second entities provides backup coverage for the first wireless communication device.

14. The method of claim 1, wherein the wireless metropolitan area network (WMAN) is one of an ad-hoc network and an infrastructure based network.

15. A method of facilitating a fast handoff for a first wireless communication device in a wireless metropolitan area network (WMAN), the method comprising:

at the first wireless communication device:

establishing an association with a first entity;

establishing a plurality of pending associations with a plurality of second entities by the first entity informing each of the plurality of second entities of a pending association request and each of the plurality of second entities informing the first entity of a pending association response so that the first entity informs the first wireless communication device of the pending association, prior to determining a need for handoff of the first wireless communication device to one of the plurality of second entities;

selecting a pending association associated with one of the plurality of second entities when the need for handoff of the first wireless communication device to one of the plurality of second entities is determined;

converting the selected pending association into a second hard association;

converting the first hard association into one of the plurality of pending associations, after converting the selected pending association into the second hard association;

wherein the first entity is one of a second wireless communication device and a first access point, and wherein each of the plurality of second entities is one of a third wireless communication device and a second access point.

16. The method of claim 15, wherein the first wireless communication device is at least one of a) outside a coverage area of the second entity and b) not able to directly communicate with the second entity.

17. The method of claim 15, wherein at least one of the plurality of second entity is in communication with the first entity via a backhaul network.

18. The method of claim 15, wherein the first wireless communication device identifies at least one of the plurality of second entity from a neighbor list.

19. The method of claim 15 wherein the step of establishing an association with a first entity further comprises at least one of a) the first wireless communication device sending a pending association request to the first entity and the first wireless communication device receiving a pending association response in response to the pending association request and b) the first wireless communication device sending a hard association request to the first entity and receiving a hard association response in response to the hard association request.

20. A method of facilitating a fast handoff for a first mobile device in a wireless metropolitan area network (WMAN), the method comprising:

at the first mobile device:

establishing a hard association with a second mobile device by sending a hard association request to the second mobile device and receiving a hard association response in response to the hard association request;

establishing a plurality of pending associations with a plurality of mobile devices by sending a pending association request to each of the plurality of mobile devices and receiving a pending association response from the each of the plurality of mobile devices, prior to determining a need for handoff of the first mobile device to one of the plurality of mobile devices;

selecting a pending association associated with one of the plurality of mobile devices when the need for handoff of the first mobile device to one of the plurality of mobile devices is determined;

converting the selected pending association into a second hard association; and converting the first hard association into one of the plurality of pending associations, after converting the selected pending association into the second hard association.

21. The method of claim 1, wherein the first wireless communication device is associated to each of the plurality of pending association at the same interval of time.

22. The method of claim 1, wherein the hard association is defined as an association where an entity is responsible for providing network services to the first wireless communication device.

23. The method of claim 1, wherein the plurality of pending associations expedite future handoffs.

24. The method of claim 1, wherein determination of the need for handoff of the first wireless communication device comprises:

determining that the first wireless communication device moves out of coverage of the first entity; or determining that signal strength of the first wireless communication device becomes weak.

* * * * *

UNITED STATES PATENT AND TRADEMARK OFFICE
CERTIFICATE OF CORRECTION

PATENT NO. : 8,787,300 B2
APPLICATION NO. : 11/422187
DATED : July 22, 2014
INVENTOR(S) : Shmuel Silverman et al.

It is certified that error appears in the above-identified patent and that said Letters Patent is hereby corrected as shown below:

IN THE TITLE PAGE:

Item 75, under "Inventors", in Column 1, Line 6, delete "G Ware," and insert -- G. Ware, --, therefor.

Item 56, under "OTHER PUBLICATIONS", in Column 2, Lines 11-12, delete "Appliction" and insert -- Application --, therefor.

IN THE DRAWINGS:

In FIG. 2, Sheet 2 of 5, for Tag "205", in Line 4, delete "AN HARD" and insert -- A HARD --, therefor.

IN THE SPECIFICATION:

In Column 1, Line 9, delete "(WMAN) networks" and insert -- networks (WMAN) --, therefor.

In Column 1, Line 28, delete "may by" and insert -- may be --, therefor.

In Column 1, Line 35, delete "associated" and insert -- association --, therefor.

In Column 1, Line 39, delete "had-off" and insert -- hand-off --, therefor.

In Column 1, Line 44, delete "lone time," and insert -- long time, --, therefor.

In Column 1, Line 65, delete "fine" and insert -- find --, therefor.

Signed and Sealed this
Twenty-eighth Day of June, 2016

Michelle K. Lee
*Director of the United States Patent and Trademark Office*

CERTIFICATE OF CORRECTION (continued)
U.S. Pat. No. 8,787,300 B2

IN THE SPECIFICATION:

In Column 2, Line 2, delete "provided the ability to provided" and insert -- provide the ability to provide --, therefor.

In Column 2, Line 35, delete "with he" and insert -- with the --, therefor.

In Column 2, Line 45, delete "tat" and insert -- that --, therefor.

In Column 2, Line 62, delete ""comprises...a"." and insert -- "comprises...a", --, therefor.

In Column 3, Line 6, delete "ad in" and insert -- and in --, therefor.

In Column 4, Line 1, delete "subscribes" and insert -- subscribers --, therefor.

In Column 4, Line 27, delete "wit the" and insert -- with the --, therefor.

In Column 4, Line 34, delete "subscribers" and insert -- subscribers, --, therefor.

In Column 4, Line 35, delete "propose" and insert -- proposes --, therefor.

In Column 4, Line 50, delete "FIG,2," and insert -- FIG.2, --, therefor.

In Column 4, Line 53, delete "invention In" and insert -- invention. In --, therefor.

In Column 5, Line 4, delete "preformed" and insert -- performed --, therefor.

In Column 5, Line 20, delete "wit the" and insert -- with the --, therefor.

In Column 5, Line 40, delete "associates" and insert -- association --, therefor.

In Column 6, Line 7, delete "association by timely basis." and insert -- associations on a timely basis. --, therefor.

In Column 6, Line 41, delete "subscriber" and insert -- subscribers --, therefor.

In Column 6, Line 44, delete "preformed" and insert -- performed --, therefor.

In Column 7, Lines 11 - 12, delete "connectively" and insert -- connectivity --, therefor.

In Column 8, Line 31, delete "an 1" and insert -- an IP --, therefor.

In Column 8, Line 49, delete "subscribed" and insert -- subscriber --, therefor.

In Column 8. Line 50. delete "associated" and insert -- associate --. therefor.

CERTIFICATE OF CORRECTION (continued)
U.S. Pat. No. 8,787,300 B2

IN THE SPECIFICATION:

In Column 8, Line 51, delete "405 send" and insert -- 405 may send --, therefor.

In Column 9, Line 50, delete "subscribed 405" and insert -- subscriber 405 --, therefor.

In Column 9, Line 52, delete "done" and insert -- done by --, therefor.

In Column 10, Line 4, delete "removed In" and insert -- removed. In --, therefor.

In Column 10, Line 21, delete "through" and insert -- though --, therefor.

In Column 10, Line 25, delete "invention" and insert -- invention, --, therefor.

In Column 10, Line 28, delete "egg" and insert -- e.g. --, therefor.

In Column 10, Line 55, delete "tat would" and insert -- that would --, therefor.

In Column 10, Line 57, delete "comprise a" and insert -- comprises a --, therefor.

In Column 11, Line 25, delete "can" and insert -- can send --, therefor.

In Column 11, Lines 26 - 27, delete "association" and insert -- associations --, therefor.

In Column 11, Line 28, delete "message" and insert -- messaging --, therefor.